US 9,998,225 B2

(12) United States Patent
Yi

(10) Patent No.: US 9,998,225 B2
(45) Date of Patent: Jun. 12, 2018

(54) PROTECTED ETHERNET RING WITH SMALL FORM-FACTOR PLUGGABLE DEVICES

(71) Applicant: OE SOLUTIONS CO., LTD., Gwangju (KR)

(72) Inventor: Gwangyong Yi, Seoul (KR)

(73) Assignee: OE SOLUTIONS CO., LTD., Gwangju (KR)

( * ) Notice: Subject to any disclaimer, the term of this patent is extended or adjusted under 35 U.S.C. 154(b) by 0 days. days.

(21) Appl. No.: 15/230,398

(22) Filed: Aug. 6, 2016

(65) Prior Publication Data

US 2018/0041277 A1    Feb. 8, 2018

(51) Int. Cl.
| | | |
|---|---|---|
| *H04B 10/00* | (2013.01) | |
| *H04J 14/00* | (2006.01) | |
| *H04B 10/27* | (2013.01) | |
| *H04B 10/40* | (2013.01) | |
| *H04B 10/032* | (2013.01) | |
| *H04J 14/02* | (2006.01) | |

(52) U.S. Cl.
CPC ........... *H04B 10/27* (2013.01); *H04B 10/032* (2013.01); *H04B 10/40* (2013.01); *H04J 14/0268* (2013.01); *H04J 2203/0042* (2013.01)

(58) Field of Classification Search
CPC .................................................. H04B 10/275
USPC ............................................................ 398/3
See application file for complete search history.

(56) References Cited

U.S. PATENT DOCUMENTS

| 7,054,264 | B2* | 5/2006 | Mor | H04J 3/085 370/222 |
|---|---|---|---|---|
| 7,835,649 | B2* | 11/2010 | Epps | H04J 14/0227 398/154 |
| 7,881,617 | B2* | 2/2011 | Cohen | H04Q 11/0005 398/154 |
| 9,215,726 | B1* | 12/2015 | Adams | H04W 72/10 |
| 2002/0089716 | A1* | 7/2002 | Funk | H04L 41/0253 398/58 |
| 2002/0126334 | A1* | 9/2002 | Milton | H04J 14/0206 398/9 |
| 2002/0126343 | A1* | 9/2002 | Fumagalli | H04B 10/275 398/3 |
| 2005/0185959 | A1* | 8/2005 | Kinoshita | H04J 14/0227 398/59 |

(Continued)

OTHER PUBLICATIONS

Aracil et al., Enabling Optical Internet with Advanced Network Technologies, 2009, Springer-Verlag London, pp. 49-52.*

(Continued)

*Primary Examiner* — Ken N Vanderpuye
*Assistant Examiner* — Jai Lee
(74) *Attorney, Agent, or Firm* — Ichthus International Law PLLC

(57) ABSTRACT

An optical transceiver for use in network device in a packet network is provided. The network device may not be capable of providing a ring topology without use of the apparatus. The network device is configured to support at least two optical interfaces and an electrical interface, and coupled to an optical link. The optical transceiver includes a memory, a processor coupled to the memory, and a scheduler coupled to the processor. The scheduler of the optical transceiver is configured to perform as an information base for forwarding and transferring of packets and to use an optical link as a packet buffer.

11 Claims, 8 Drawing Sheets

(56) References Cited

U.S. PATENT DOCUMENTS

| | | | | |
|---|---|---|---|---|
| 2005/0207755 A1* | 9/2005 | Rabbat | ............... | H04J 14/0227 398/59 |
| 2005/0220102 A1* | 10/2005 | Tschudin | ............... | H04L 45/00 370/389 |
| 2006/0008273 A1* | 1/2006 | Xue | ............... | H04L 45/00 398/51 |
| 2006/0245755 A1* | 11/2006 | Gumaste | ............ | H04J 14/0227 398/59 |
| 2009/0092389 A1* | 4/2009 | Wei | ............... | H04J 14/0204 398/59 |
| 2009/0116846 A1* | 5/2009 | Noble | ............... | H04B 10/40 398/135 |
| 2010/0325588 A1* | 12/2010 | Reddy | ............... | H04L 63/0263 715/853 |
| 2013/0114958 A1* | 5/2013 | Farell | ............... | H04J 14/0283 398/49 |
| 2014/0241721 A1* | 8/2014 | Xia | ............... | H04J 14/02 398/51 |
| 2015/0200729 A1* | 7/2015 | Seo | ............... | H04B 10/40 398/79 |

OTHER PUBLICATIONS

Enachescu et al., Routers with Very Small Buffers, 2006, IEEE.*
Jowang, Overview of 1000BASE-BX SFP BiDi Transceiver, Mar. 14, 2016, http://jowang.over-blog.com/2016/03/overview-of-1000base-bx-sfp-bidi-transcever.html.*
Hecht, Jeff, Understanding Fiber Optics, 2015, Pearson Education, pp. 23-26.*
Enachescu et al., Routers with Very Small Beffers, 2006, IEEE.*

* cited by examiner

PROTECTED ETHERNET RING WITH SMALL FORM-FACTOR PLUGGABLE DEVICES

TECHNICAL FIELD

The present disclosure relates to devices for optical communications, in particular, methods and apparatuses for implementing protected Ethernet ring type networks using smart small form-factor pluggable (SFP) devices.

BACKGROUND

After optical fiber links are installed, some fiber links may not be in use (also known as "dark fibers") in a network. Network operators who suffer lack of dark fibers may use various types of ring topology because an existing point-to-point topology may consume a large amount of fiber links. Typically, to set up an Ethernet ring, a switch router may be required, which is configured to support an Ethernet ring topology and provide failure protection features for the Ethernet ring network. However, switch routers are generally expensive to many network operators and thus replacing existing devices with the switch routers, such as box-type 2 plus 1 switches, to support an Ethernet ring type network in conventional networks may result in additional installation and maintenance costs, which may drive the costs of the network high. Hence, there is still a further need for improved and cost effective solutions to constructing a protected Ethernet ring network without incurring too much of additional costs and/or expenses in the existing networks.

SUMMARY

The present disclosure provides a method and an apparatus for constructing a protected Ethernet ring network using smart optical transceivers in the existing networks. The smart optical transceivers may include optical transceivers in various form factors, such as small form-factor pluggable (SFP), compact SFP (CSFP), 10 Gigabit small form factor pluggable (XFP), etc. In accordance with an aspect of the present disclosure, each smart optical transceiver may include at least two optical interfaces and one single electrical interface.

In another aspect of the present disclosure, each of the smart optical transceivers may be configured to behave as a 2×1 (or also known as "2 plus 1") Ethernet switch router, many of the functionality of which may be implemented in a small form-factor pluggable (SFP) module.

In contrast, by way of example, conventional Compact SFP (CSFP) devices may support two optical ports and two electrical interfaces or connection ports of which are multi source agreement (MSA) compliant. The conventional CSFP devices support only on-off modulation of a binary signal. As such, if network operators desire to have one or more Ethernet protection applications in their networks, they may need to upgrade their existing networks by adding additional equipment or devices with enhanced features such as Ethernet protection.

In an aspect of the present disclosure, two optical ports may be integrated and protection functions may be simplified in such a way that to implement the protected Ethernet ring network, the network operators may just need to plug in smart optical transceivers, e.g., smart SFP modules, which are configured to support an Ethernet ring topology in accordance with the present disclosure. As a result, the network operators may implement one or more Ethernet ring protection schemes in their existing networks without making significant changes to their existing equipment which are by themselves not capable of supporting any Ethernet ring and/or protection function in the deployed network.

In an aspect of the present disclosure, a device, an apparatus or an optical transceiver is provided for use in a packet network for optical communications. By way of example, the optical transceiver may include a memory, a processor and a scheduler coupled to the processor for implementing a ring type network topology. The processor of the optical transceiver may be further configured to perform, using one or more schedulers, as an information base for forwarding and transferring packets, and to use an optical link as a packet buffer.

In an aspect of the present disclosure, a length of the packet buffer may be determined based in part on one or more measurements of delay on the optical link. For example, when the measurement delay of a packet is measured on the optical link, a length of the packet buffer may be determined as follows. In one implementation, the length of the packet buffer may be computed by a propagation delay measured on the optical link divided by an operating frequency of a packet network forming a ring topology. Assuming that a light propagation delay is $\Delta$ seconds in an optical glass and a data rate is $\alpha$, then the optical buffer length may be computed as $\Delta$ times $\alpha$. As an example, when an optical fiber link of 1 Km has a light propagation delay of 5 μsec and the network supports a data rate of 1 Gbps, the packet buffer length may be estimated to be 500 bits/Km.

In an aspect of the present disclosure, instead of Ethernet, other networking technology may be used in the packet network, such as Fiber Distributed Data Interface (FDDI), Synchronous Optical Network (SONET), Synchronous Digital Hierarchy (SDH), SONET Plesiochronous Digital Hierarchy (PDH), or the like.

In an aspect of the present disclosure, the optical transceiver may include at least two optical interfaces and one electrical interface. In another aspect, the optical transceiver may include a smart small form-factor pluggable (SFP) or a compact SFP module. In another aspect, the optical transceiver may include a smart bi-directional small form-factor pluggable (BiDi SFP).

Further, in an aspect of the present disclosure, a network arrangement for digital communications may be provided in a packet network. the packet network may include an Ethernet network, a Fiber Distributed Data Interface (FDDI), Synchronous Optical Network (SONET), Synchronous Digital Hierarchy (SDH), or Plesiochronous Digital Hierarchy (PDH) network. The network arrangement may include an access point device, one or more network elements each provisioned with a single network port and coupled to an optical link, and one or more smart optical transceivers. Each of the one or more smart optical transceivers may include at least two optical interfaces and an electrical interface, and when the one or more smart optical transceivers are plugged into one or more network elements and an access point device, the network arrangement may be configured to form a protected ring topology.

In an aspect of the present disclosure, the one or more smart optical transceivers the network arrangement may include small form-factor pluggables (SFPs) or smart compact small form-factor pluggables (CSFPs).

In an aspect of the present disclosure, the access point of the network arrangement may include a femto access point, a security gateway, or a small cell gateway.

In another aspect of the present disclosure, the network arrangement may further include a scheduler configured to perform as an information base for forwarding and transferring packets, and to use the optical link as a packet buffer. The length of the packet buffer may be determined based in part on a propagation delay measured on the optical link divided by an operating frequency of the packet network having the ring topology.

As such, in accordance with various aspects of the present technology disclosed herein, a network operator may build and maintain a network architecture that is much simpler to operate with enhanced flexibility and fault tolerance to deliver new services with reduced capital expenditures (CapEx) and operating expenses (OpEx).

These and other aspects of the present disclosure will become more fully understood upon a review of the detailed description, which follows.

BRIEF DESCRIPTION OF THE DRAWINGS

A more detailed understanding may be obtained from the following description in conjunction with the accompanying drawings.

DETAILED DESCRIPTION

Figure 1:
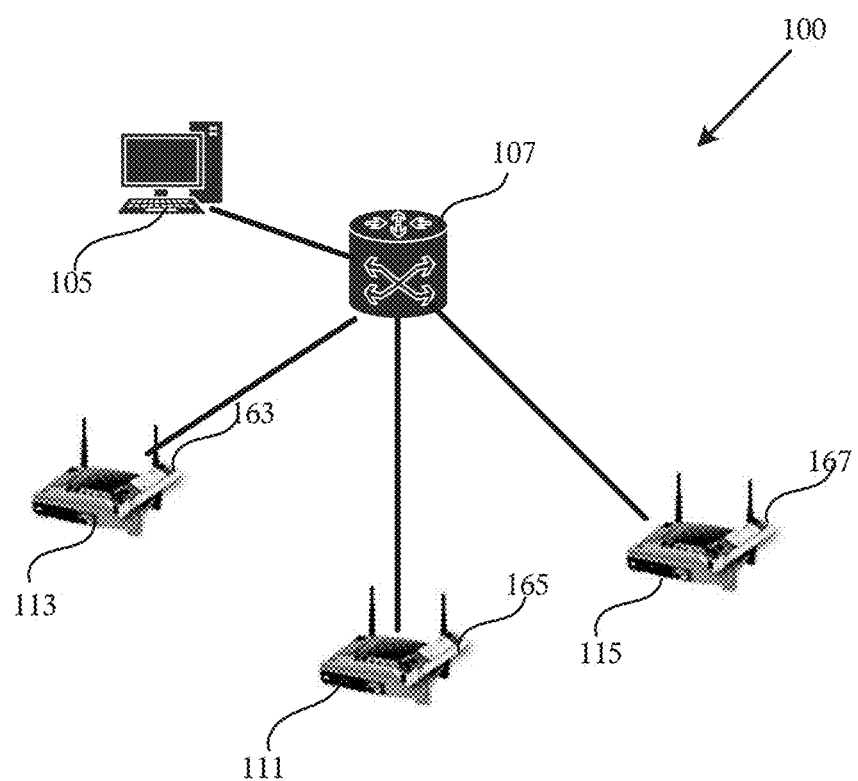
FIG. 1 illustrates an example of a network topology.

The detailed description of illustrative examples will now be set forth below in connection with the various drawings. The description below is intended to be exemplary and in no way limit the scope of the claimed invention. It provides a detailed example of possible implementation, and is not intended to represent the only configuration in which the concepts described herein may be practiced. As such, the detailed description includes specific details for the purpose of providing a thorough understanding of various concepts, and it is noted that these concepts may be practiced without these specific details. In some instances, well known structures and components are shown in block diagram form in order to avoid obscuring such concepts. It is noted that like reference numerals are used in the drawings to denote like elements and features.

Ethernet is the most popular physical layer local area network (LAN) technology. There are many LAN topology types such as a token ring, fast Ethernet, gigabit Ethernet, 10 gigabit Ethernet, fiber distributed data interface (FDDI), etc. As shown in FIG. 1, generally speaking, in a related art, Ethernet uses a star topology 100 with point-to-point segments, in which network access may be controlled by a central management computer or device 105. In the example shown in FIG. 1, in the star topology, the central management computer or device 105 may be located at one end of a network segment and the other end may be terminated in a central location with a hub or a switch 107. There are advantages as well as disadvantage of the star topology. For example, in the star topology, new nodes or devices can be easily added or removed without affecting rest of the network, and failure of one node or link does not affect the rest of the network. However, in the star topology, there is too much dependency on central device and thus if the central device fails, the whole network may go down, and also the use of a hub or a router or a switch as the central device may increase the overall cost of the network, etc.

On the other hand, a ring topology offers an alternative network topology. A ring topology is a network configuration in which devices are connected to each other in a circular fashion. Each packet is sent around the ring until the packet reaches its final destination. Advantages of ring topology are a central device is not needed to control network connectivity between each device, data can transfer between devices at high speed, and additional devices can be added without impacting the performance of the network. However, implementing the ring topology may require installation of expensive networking devices.

Further, a ring topology may be implemented using Ethernet as a network design choice. Ethernet is traditionally used on a bus or a star topology but in certain situations a ring topology may be implemented to provide various benefits. For example, some service providers may consider building a ring topology over Ethernet in design of their network such as a metropolitan area network (MAN) to develop a service in a region where it is difficult to create point-to-point fiber links from the central office to customer sites. In an Ethernet ring, there are multiple devices with adjacent devices coupled together via an independent link. So, failures in the Ethernet ring may be mitigated by avoiding loops via a link blocking mechanism. By way of example, when a link fails, its end devices will block the port to the link after detecting the failure, and the end devices will send a message about the failure using their other working port. There are many proprietary schemes and industry standards or the like, providing for detailed procedures for automatic protection switching in an Ethernet ring in case of such failures.

Figure 2:
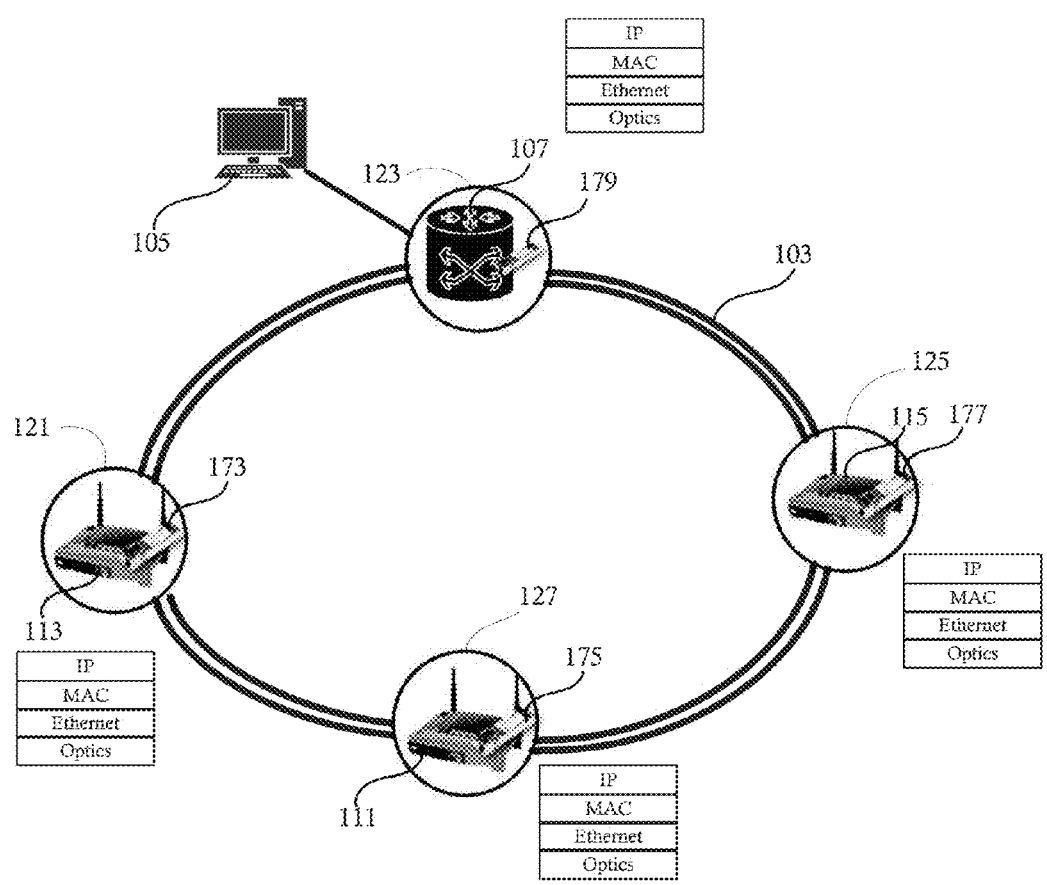
FIG. 2 illustrates an example of a network topology in accordance with an aspect of the present disclosure.

FIG. 2 is an example of a network diagram conceptually illustrating a ring-type Ethernet topology in accordance with an aspect of the present technology. In one implementation, as shown in FIG. 2, a failure protected Ethernet ring topology may be constructed using multiple optical transceivers in the existing network environment without using additional hardware or expensive equipment.

In the example shown in FIG. 2, an Ethernet ring network 103 may be implemented using existing network elements 121, 123, 125, and 127, in conjunction with smart optical transceivers in accordance with various aspects of the present disclosure. Each of the existing network elements 121, 123, 125, and 127 may include a conventional femto access point (AP) or other device such as 123 (i.e., security gateway or small cell gateway) that may include a single network port. As noted earlier, as shown in FIG. 1, in the existing network, the network may only form a point-to-point network and may not form a fault protected Ethernet ring network because of hardware limitations of the existing devices that are deployed in the existing network. As a result, to form a fault protected Ethernet ring network, rather than installing new hardware to replace the femto APs or other existing devices that are configured to support only a single network port, the smart SFP modules may be used to implement the fault protected Ethernet ring network, in accordance with an aspect of the present disclosure. The new hardware may be provided with additional capability of providing at least two ports for network connection, e.g., a new switching device or router, which may be expensive.

As shown in FIG. 2, however, optical transceivers such as 173, 175, 177, and 179 with enhanced capability ("smart optical transceivers") in accordance with an aspect of the present disclosure may be used to upgrade and add enhanced capability to the existing femto APs or devices to implement the protected Ethernet ring topology such as 103. As a result, the smart optical transceivers in accordance with an aspect of the present disclosure may provide a greater amount of cost savings of dark fibers, power consumption, and additional capital investment compared to adding new hardware.

In the example, each of the smart optical transceivers such as 173, 175, 177, and 179 may be provided with a bidirectional (BiDi) capability via a programmable device such as a field programmable gate array (FPGA). In an aspect of the present disclosure, the smart optical transceivers may be in a different form factor, such as smart small form-factor pluggable (SFP) modules, compact SFP (CSFP) modules, a smart bi-directional (BiDi) SFP or the like.

Further, as noted above, the smart optical transceivers 173, 175, 177, and 179 may be used in conjunction with the existing hardware such as routers, femto APs, security gateways or small cell gateways, or other devices 111, 113, 115, and 117, each of which includes a single network port. In an aspect of the present disclosure, however, the existing routers, femto APs, security gateways or small cell gateways, or devices may be transformed into more enhanced devices or switching router-like devices to construct an Ethernet ring topology with failure protection features.

In one implementation, the smart optical transceivers 173, 175, 177, and 179 may include CSFP modules, which may be referred to as double BiDi or dual-channel Bidi SFP. Further, the smart optical transceivers may include two gigabit optics inside one of the SFP housing. Also, the CSFP transceivers may be implemented as a 2-channel Bi-directional optical transceiver unit with, among others, a laser diode (LD) driver, a limiting amplifier, a LD and a photo detector (PD), or etc. to increase port density and decrease fiber usage per port. The CSFP Multi-Source Agreement (MSA) defines requirements for a transceiver mechanical form-factor with a latching mechanism, a host board, an electrical edge connector and a housing. In an aspect of the present disclosure, the router 107 may see the ring 103 as a switching network (e.g., a L2 switching network), independently adding nodes and extending a reach while saving fibers.

Figure 3:
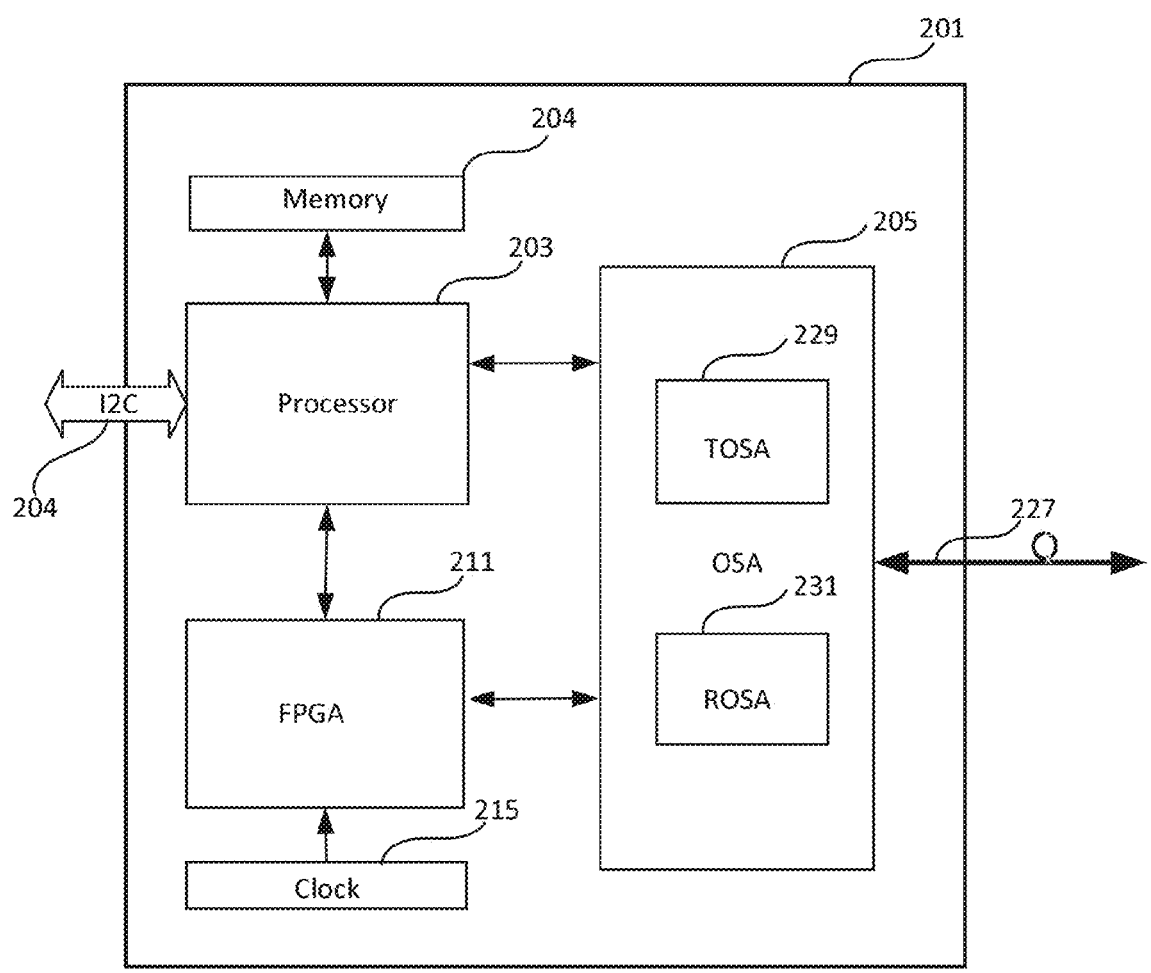
FIG. 3 is a diagram conceptually illustrating an example of a smart optical transceiver in accordance with an aspect of the present disclosure.

FIG. 3 illustrates a block diagram conceptually illustrating various components of a smart optical transceiver, in accordance with an aspect of the present disclosure. By way of example, the smart optical transceiver 201 may include various components such as a processor 203 coupled to a memory 204, an optical subassembly (OSA) 205, a field programmable gate array (FPGA) 211, a clock 215, an I2C interface 204, and an optical link interface 227.

The processor 203 of the smart optical transceiver 201 may include one or more processors, microcontrollers, application specific integrated circuits (ASICs), digital signal processors (DSPs), or the like, and may be configured to manage and control various components of the smart optical transceiver 201, such as the OSA 205, the FPGA 211, the clock 215, the I2C interface 204, the optical link interface 227, or the like.

The memory 204 coupled to the processor 203 may be also coupled to various other components in the smart optical transceiver 201. The memory 204 may include a read-only-memory (ROM) or a random access memory (RAM). Further, although the memory 204 may be coupled to the processor 203 as an external memory as shown in FIG. 3, in other implementations, the memory 204 may be included or embedded in the processor 203. Further, the memory 204 may be configured to store various parameters, including controls parameters to control the OSA 205 and/or the FPGA 211.

The OSA 205 may include a transmitter optical subassembly (TOSA) 229 and a receiver optical subassembly (ROSA) 231. The TOSA 229 is configured to receive electrical signals and convert them into optical signals for transmission over an optical fiber via the optical link interface 227, and the ROSA 231 is configured to receiver optical signals via the optical link interface 227 from the optical fiber, and convert them into electrical signals for reception and further processing. The TOSA 229 may include various components (not shown) including a laser diode (LD), an electrical interface and an optical interface for converting electrical signals into optical signals and transmitting the optical signals over the optical fiber. The ROSA 231 may include various components (not shown) including a photo diode (PD), an optical interface and an electrical interface for receiving optical signals via the optical link interface 227 and converting the optical signals into electrical signals for further processing. Also, in another aspect of the present disclosure, the OSA 205 may be implemented as or include a bidirectional optical subassembly (BOSA).

The FPGA 211 may be configured to implement one or more functions or aspects of the present technology described herein. Although FIG. 3 illustrates an example implementation of a field programmable device such as the FPGA 211 in the smart optical transceiver, it may not be limited thereto. Further, the FPGA 211 may be implemented as one or more field programmable gate arrays, one or more processors, microcontrollers, integrated circuits, hardware logic, software components, or any combination thereof, or the like.

The I2C interface may include a 2-wire serial bus through which the processor 203 may monitor and communicate various parameters and conditions including operating and diagnostic information to/from a host device external to the smart optical transceiver 201.

Figure 4:
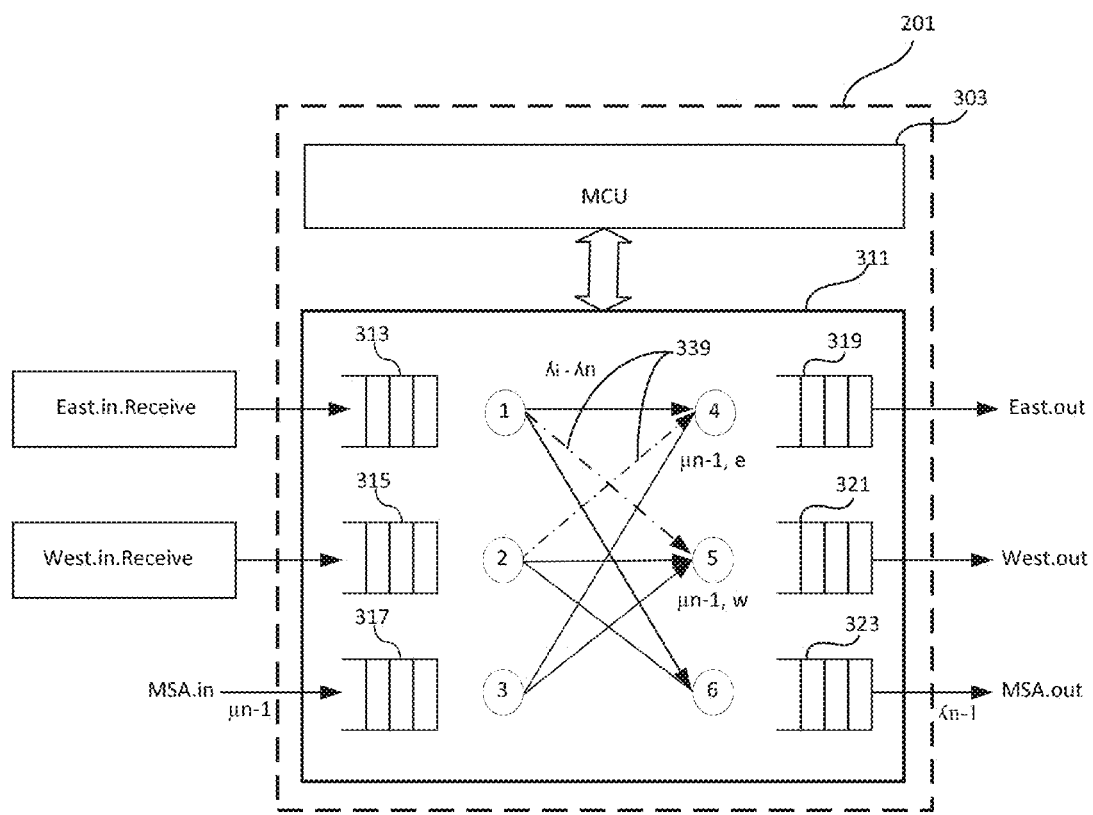
FIG. 4 is a diagram conceptually illustrating an example of a smart optical transceiver in accordance with an aspect of the present disclosure.

FIG. 4 is a high level block diagram conceptually illustrating an embodiment in accordance with an aspect of the present disclosure. By way of example, each of the smart optical transceivers, i.e., smart SFPs such as 173, 175, 177, and 179 of FIG. 2, which are to be plugged into the femto APs or devices 111, 113, 115, and 107 may be implemented as shown in FIG. 3 as well as FIG. 4. That is, at a high level, each of the smart SFPs may include a processing system 303, such as a microcontroller (MCU), and a FPGA 311 coupled to the processing system 303 via various means including a bus interface. Although a smart SFP 201 may include various other components, for the purpose of simplicity and illustrative purposes, descriptions of the various components of the smart SFP 201 are omitted herein.

In the example, as shown in FIG. 4, the FPGA 311 may include a plurality of packet buffers such as buffers 313, 315, 317, 319, 321, and 323 in accordance with an aspect of the present disclosure. Each of the plurality of packet buffers may be associated with an input port or an output port. For example, the smart SFP module may include two types of bi-directional ports such as first bidirectional ports and second bidirectional ports. The first bidirectional ports may include East.in and East.out and the second bidirectional ports may include West.in and West.out.

By way of example, during a normal operation of the smart SFP 201, traffic data arriving at a packet buffer 315 (e.g., West.in.Receive) may be routed to a packet buffer 321 (i.e., a path from "2" to "5") and to West.out, or a packet buffer 323 (i.e., a path from "1" to "6") and to MSA.out. Further, during the normal operation, traffic data arriving at a packet buffer 313 (e.g., East.in.Receive) may be routed to a packet buffer 319 (i.e., a path from "1" to "4") and to East.out, or a packet buffer 323 (i.e., a path from "1" to "6") and to MSA.out. Local traffic data in the femto AP arriving at a packet buffer 317 (e.g., MSA.in) may be routed to the packet buffer 319 (i.e., a path from "3" to "4") and to East.out, or to the packet buffer 321 (i.e., a path from "3" to "5") and to West.out.

However, when a fault condition or failure occurs in the switching or routing paths, an alternative path or a protected path may be established. That is, when there is a fault condition or failure in a path to a destination of packets from the packet buffer 315, an alternative path 339 (e.g., a broken line) may be established between the West.in and East.out, and thus the traffic arriving at the packet buffer 315 may then be routed to the packet buffer 319 (i.e., a path from "2" to "4") and to East.out. Similarly, when there is a fault condition or failure in a path to a destination of packets from the packet buffer 313, an alternative path 339 (e.g., a broken line) may also be established as shown from East.in to West.out, and thus the traffic arriving at the packet buffer 313 may be routed to the packet buffer 321 (i.e., a path from "1" to "5") and to West.out. As such, with the implementation of dual bidirectional ports in the smart optical transceivers such as the smart SFPs 201, in accordance with aspects of the present disclosure, a failure protected Ethernet ring network may be built using the smart optical transceivers such as the smart SFPs 201, without using any additional hardware and/or devices such as switch routers, or the like to the existing network. That is, to build failure protected Ethernet networks, the operators may only need to plug in the smart SFPs into the existing access points or network elements in accordance with various aspects of the present disclosure.

Figure 5:
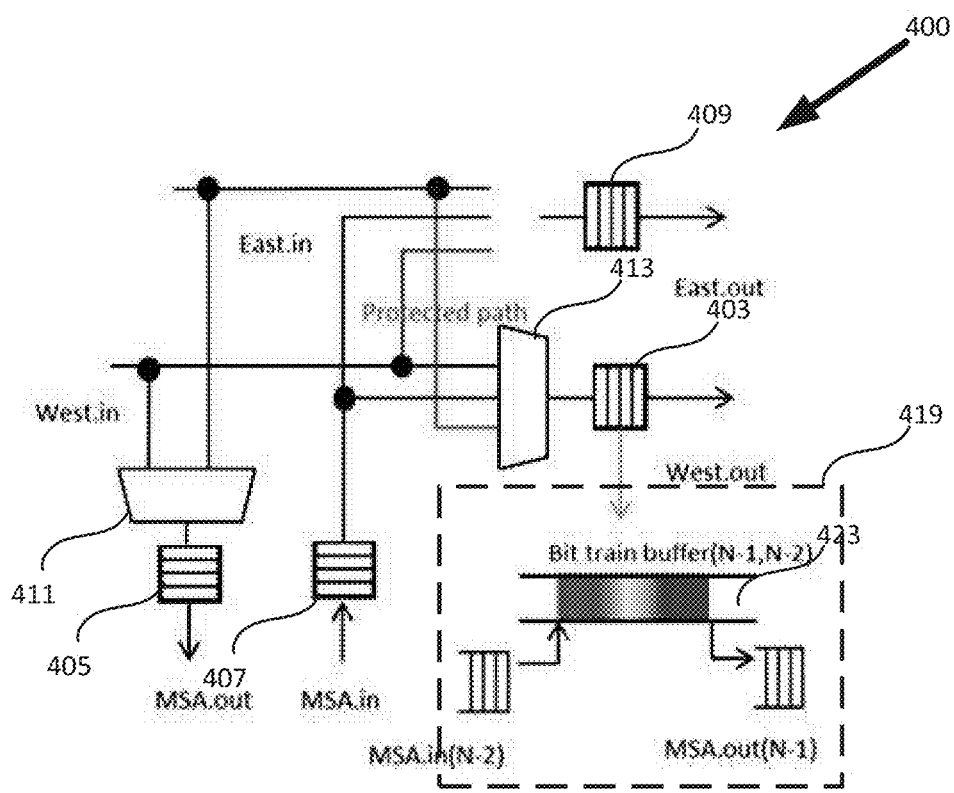
FIG. 5 is a diagram conceptually illustrating an example of an implementation in accordance with an aspect of the present disclosure.

FIG. 5 is a diagram conceptually illustrating an example embodiment in accordance with an aspect of the present disclosure. In an aspect of the present disclosure, FIG. 5 illustrates a switching fabric 400 inside the smart SFP 201 as described above. By way of example, the switching fabric 400 may include various input ports (e.g., West.in, East.in, MSA.in) and output ports (e.g., West.out East.out, MSA.out), multiplexers 411 and 413, and associated buffers such as buffers 403, 405, 407, and 409. In the present disclosure, one electrical interface (e.g., MSA) is used rather than two electrical interfaces (e.g., MSAs).

In an aspect of the present disclosure, the diagram of FIG. 5 shows an example replacement of one of the associated buffers using the present technology disclosed herein. By way of example, at least one buffer, e.g., West.out 403, may be replaced by an imaginary buffer which is called a bit stream buffer 423 over an optical link. Here, the bit stream buffer is an optical link being represented as a packet buffer. This is possible, in an aspect of the present disclosure, since the optical link is of a certain length between two remote nodes, the optical link may be considered as an optical buffer that stores information bits between the two remote nodes.

As such, as shown in FIG. 5, the packet buffer or the bit stream buffer 423 (e.g., bit train buffer (N-1, N-2)) may work as a data or information buffer between two ports, e.g., MSA.in (N-2) and MSA.out (N-1), thereby reducing a number of physical buffers (e.g., buffers 403, 405, 407, and 409) implemented in the smart SFP 201.

Further, in an aspect of the present disclosure, a length of the packet buffer may be determined based in part on one or more measurements of delay on the optical link. In one implementation, the length of the packet buffer may be based on a propagation delay measured on the optical link divided by an operating frequency of a packet network having a ring network topology as shown in FIG. 2. In the implementation, the packet buffer length from the optical link may be computed as follows, for example. Assuming that a light propagation delay is $\Delta$ seconds in an optical glass or link and a data rate is $\alpha$, then the packet buffer length of the optical link may be computed as $\Delta$ multiplied by $\alpha$. As a numerical example, one can note that when an optical fiber of 1 Km in length with the light delay of 5 µsec and data rate of 1 Gbps is used, the length of the packet buffer using the optical fiber may be estimated to be 500 bits/Km. This information may be used by one or more components such as a scheduler to implement functions of a protected Ethernet ring network as shown in FIG. 2.

In implementing switching functions or fabric as shown in FIG. 5, various buffers may be managed and controlled by one or more schedulers or components. The various buffers may be implemented in hardware, memory, registers, software components, or any combinations thereof. The one or more schedulers may also manage and control reception, storing, and transmission (or forwarding) of packet data using the various buffers. Also, the one or more schedulers may control and manage input ports and output ports.

Figure 6:
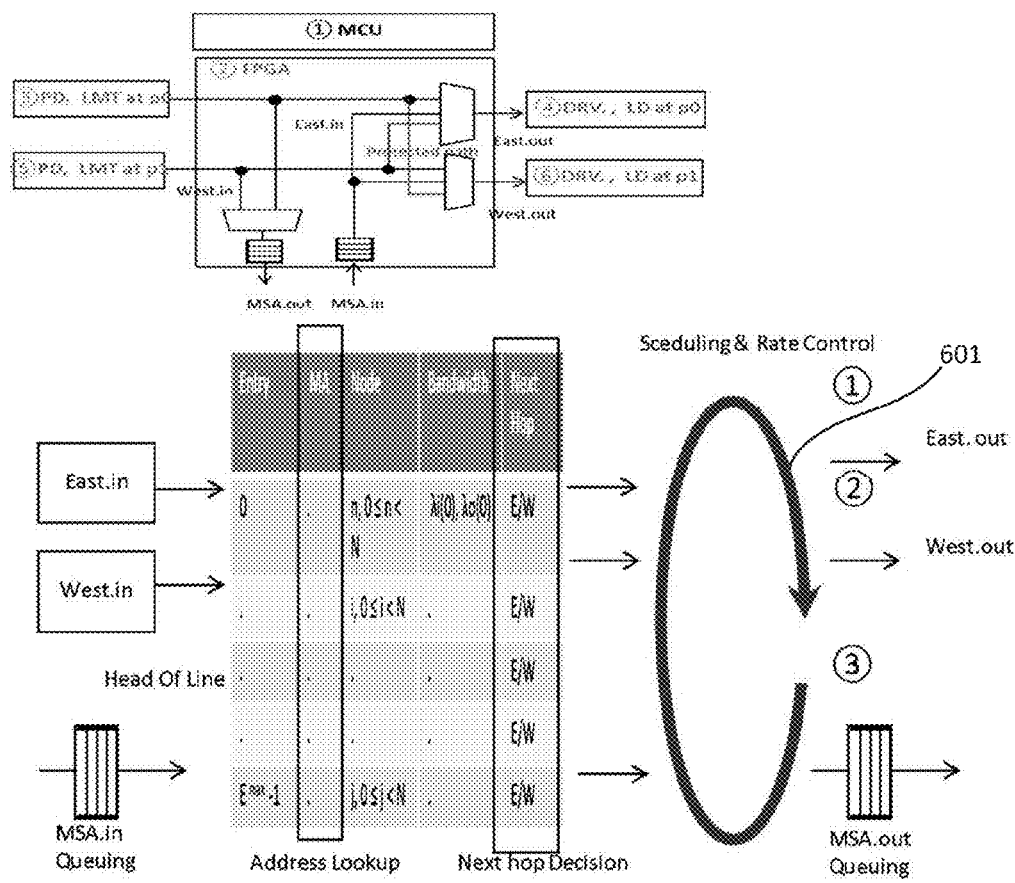
FIG. 6 is a diagram conceptually illustrating an example of an implementation in accordance with an aspect of the present disclosure.

In the example, as shown in FIG. 6, one or more schedulers 601 are configured to control and manage each of the ports of the smart SFP 201, such as West.in, West.out, East.in, East.out, MSA.in and MSA.out. Functions such as scheduling, storing, forwarding, and re-routing may be implemented using various existing methods and/or technologies. For example, in one implementation, data forwarding and re-routing functions may be managed by a processing system, including a processor or a microcontroller, and scheduling may be managed and controlled by a server or a computer external to the smart SFP. Alternatively, the scheduling may also be managed and/or controlled by the processing system in the smart SFP. Further, in one implementation, a scheduling method such as a bit-level scheduling method may be used.

As noted above, the one or more schedulers may also be implemented in a software component or a hardware component, or a combination thereof, in the processor 203 and/or the FPGA 211 as shown in FIG. 3, and may be configured to perform as an information base for forwarding and transferring packets. The one or more schedulers may also be configured to use an optical link as a packet buffer, in which a length of the packet buffer may be determined based on one or more measurements of optical propagation delay on the optical link. In one implementation, the length of the packet buffer may be determined based on a propagation delay measured on the optical link divided by an operating frequency of a packet network having an Ethernet ring topology.

Furthermore, in another implementation, as shown in FIG. 6, a lookup table and a bit-level scheduler may be implemented along with MSA queuing buffers, such as MSA.in and MSA.out. The lookup table may include various information including address lookup (i.e., MA), mode, bandwidth, and next hop decision. As such, the one or more schedulers 601 as shown in FIG. 6 may be configured to schedule and control the tasks of scheduling and managing rates of data transfer from the input ports such as East.in, West.in, and MSA.in queuing to the output ports such as East.out, West.out, and MSA.out queuing. Further, the implementation shown in FIG. 6 may also include an implementation of a packet buffer using the optical link, reducing the number of physical buffers in the smart SFP, and thus reducing the costs and improving efficiency of the switching fabric disclosed herein.

As a result, in accordance with various aspects of the present technology disclosed herein, the network operator may build and maintain a network architecture that is much simpler to operate with enhanced flexibility and fault tolerance, such as failure protected Ethernet ring networks, to deliver new services with reduced capital expenditures (CapEx) and operating expenses (OpEx).

Figure 7:
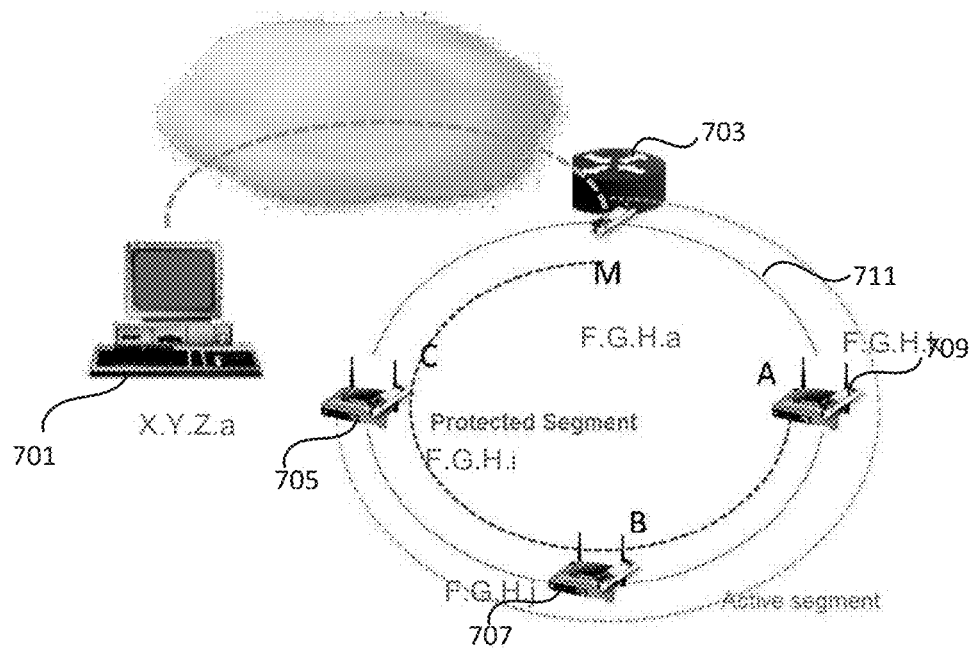
FIG. 7 is a diagram conceptually illustrating an example of an implementation in accordance with an aspect of the present disclosure.

FIG. 7 illustrates a diagram for discovering network nodes in accordance with an aspect of the present disclosure. By way of example, a subnet of network nodes 703, 705, 707, and 709 forming a ring topology 711 using the smart optical transceivers installed in the network nodes 703, 705, 707, and 709, in accordance with various aspects of the present disclosure. In one implementation, the network nodes are installed as a ring topology. As shown in FIG. 7, an active segment and a protected segment may using the network nodes 703, 709, 707, and 705.

The network nodes are known and each of the network nodes is configured to determine a host internet protocol (IP) address by means of various methods, e.g., packet spoofing such as dynamic host configuration protocol (DHCP), internet control message protocol (ICMP), address resolution protocol (ARP) or the like. In the example, the network nodes may discover each other, as follows. A management server 701 sends a multicast packet to a subnet of network nodes. Upon receipt of the multicast packet, each of the network nodes sends an acknowledgement packet to the management server 701 with the IP address of the host, utilizing a specific port number in the packet. Further, an IP address table may be maintained and periodically managed with a timer in each of the network nodes in the ring topology. Furthermore, in other implementations, the ring topology may be formed in a virtual local area network, a secure metropolitan area network, or the like.

In another aspect of the present disclosure, the ring network topology may include not only an Ethernet network, but also a Fiber Distributed Data Interface (FDDI), Synchronous Optical Network (SONET), Synchronous Digital Hierarchy (SDH), or Plesiochronous Digital Hierarchy (PDH) network.

Various aspects of the present disclosure may also be implemented by one or more processing systems. For example, the smart optical transceivers 173, 175, 177, and 179 (or 201), or its various components as shown in FIGS. 3 and 4 may be implemented with a bus architecture. The bus architecture may include a bus and any suitable number of interconnecting buses and bridges, as shown in FIG. 8.

Figure 8:
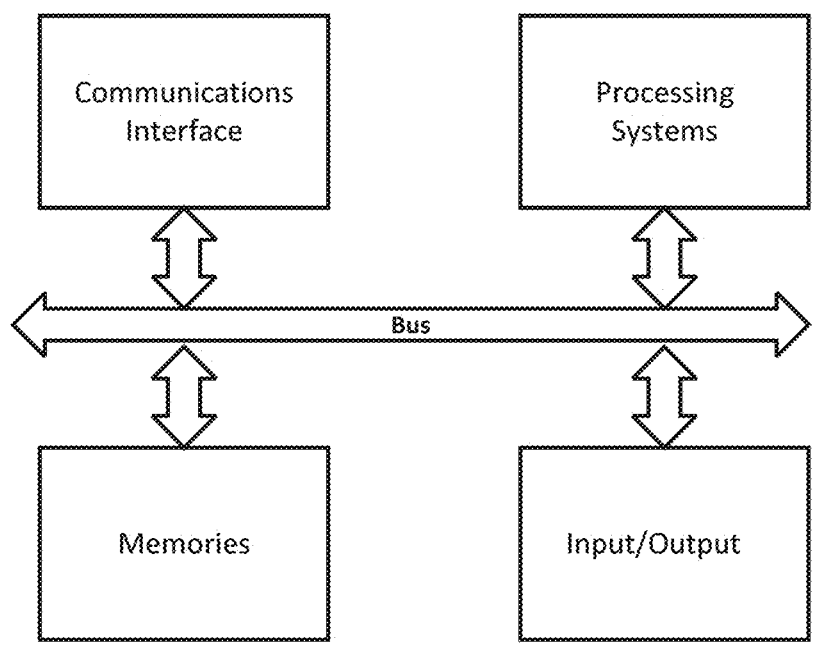
FIG. 8 is a diagram conceptually illustrating a computing system in accordance with an aspect of the present disclosure.

FIG. 8 shows a conceptual diagram illustrating a computing system. As shown in FIG. 8, the bus may link together various circuits, including one or more processing systems (or processors), one or more memories, one or more communication interfaces, and/or one or more input/output devices. The one or more processing systems may be responsible for managing the bus and general processing, including the execution of software stored on a non-transitory computer-readable medium. Further, the one or more processing systems may include one or more processors, such as microprocessors that interpret and execute instructions. In other implementations, the one or more processing systems may be implemented as or include one or more application specific integrated circuits, field programmable logic arrays, or the like. The software, when executed by the one or more processing systems, may cause the one or more processing systems to perform the various functions described herein for any particular apparatus. The non-transitory computer-readable medium may also be used for storing data that is manipulated by the one or more processing systems when executing software. The one or more memories may include various types of memories, including a random access memory and/or a read only memory, and/or other types of magnetic or optical recording medium and its corresponding device for storing information and/or instructions and/or retrieval thereof. The one or more communication interfaces may also include any transceiver-like mechanism that enables communications with other devices and/or systems, including optical transceivers (e.g., transceivers including components such as TOSA and/or ROSA). The one or more input/output devices may include devices that permit inputting information and/or outputting information to an operator.

The term "small form-factor (SFP)" or "SFP module" as used herein refers to a specification for optical modular transceivers, which are designed for use with small form-factor connectors and may be hot-swappable devices. The SFPs or SFP modules may be multi-source agreement (MSA) compliant and allow for optical and/or electrical interfaces, converting the electrical signals to optical signals, vice versa, and may be available for use with a variety of media, such as copper media, optical fiber (e.g., multimode optical fiber, or single mode optical fiber), etc. Generally, an existing SFP module may be used to plug into a port of a network switch and connect to an optical link or a fiber channel and gigabit Ethernet (GbE) optical fiber cables at another location. Thus, the existing SFP module may enable the same electrical port on a network switch to connect to different types of optical links or fibers, including multimode or single-mode fibers.

Even though particular combinations of features are disclosed in the specification and/or recited in the claims, these combinations are not intended to limit the disclosure of the present technology. Further, the methods or methodologies for the present technology disclosed herein may be implemented in software, hardware, any combinations of software and hardware, a computer program or firmware incorporated in a computer readable medium for execution by a controller, a processor, a computer, or a processing system that includes one or more processors. Examples of processors include microcontrollers, microprocessors, digital signal processors (DSPs), discrete hardware circuits, gated logic, state machines, programmable logic devices (PLDs), field programmable gate arrays (FPGAs), and other suitable hardware configured to perform various functions described herein.

The term "software" as used herein is to be construed broadly to mean any instructions, instruction sets, programs, subprograms, code, program code, software modules, applications, software packages, routines, objects, executables, threads of execution, procedures, functions, etc. including firmware, microcode, middleware, software, hardware description language, or the like.

The software may also refer to general software, firmware, middleware, microcode, hardware description language, or etc. As noted above, the software may be stored on a computer-readable medium. Examples of a computer-readable medium may include a non-transitory computer-readable medium, such as, by way of example, an optical disk, a magnetic storage device, a digital versatile disk, a flash memory, random access memory (RAM), read only memory (ROM), a register, programmable ROM (PROM), erasable PROM (EPROM), electrically erasable PROM (EEPROM), a removable disk, a flash memory device, and any other suitable medium for storing software that may be accessed and read by a processor or a processing system. It is also appreciated that one skilled in the art will recognize how best to implement the described functionality relating to adding new system functionalities to an existing network element, depending upon a particular application within design constraints.

The term "unit" or "component" as used herein means software, hardware, or any combinations thereof. A "unit" may be implemented as a software component, a hardware component, or any combinations thereof, including a field programmable gate array (FPGA), logic, logic arrays, application specific integrated circuit (ASIC), digital signal processor (DSP), microcontroller, microprocessor, etc. or any combinations thereof. The term "unit" thus may include software components, task components, processes, procedures, functions, program code, firmware, micro-codes, circuits, data structures, tables, arrays, and variables.

While for the purpose of simplicity the methodologies are described herein as a series of steps or acts, it is to be understood that the claimed subject matter is not limited by the order of steps or acts, as some steps or acts may occur in different orders and/or concurrently with other acts from that shown and described herein. Further, not all illustrated steps or acts may be required to implement various methodologies according to the present technology disclosed herein. Furthermore, the methodologies disclosed herein and throughout this specification are capable of being stored on an article of manufacture to facilitate transporting and transferring such methodologies to one or more processing systems. The term "article of manufacture" is intended to encompass a computer program accessible from any computer-readable device, carrier, or medium. A singular form may include a plural form if there is no clearly opposite meaning in the context. Also, as used herein, the article "a" is intended to include one or more items. Further, no element, act, step, or instruction used in the present disclosure should be construed as critical or essential to the present disclosure unless explicitly described as such in the present disclosure. As used herein, except explicitly noted otherwise, the term "comprise" and variations of the term, such as "comprising," "comprises," and "comprised" are not intended to exclude other additives, components, integers or steps. The terms "first," "second," and so forth used herein may be used to describe various components, but the components are not limited by the above terms. The above terms are used only to discriminate one component from other components, without departing from the scope of the present disclosure. Also, the term "and/or" as used herein includes a combination of a plurality of associated items or any item of the plurality of associated items. Further, it is noted that when it is described that an element is "coupled" or "connected" to another element, the element may be directly coupled or directly connected to the other element, or the element may be coupled or connected to the other element through a third element. A singular form may include a plural form if there is no clearly opposite meaning in the context. In the present disclosure, the term "include" or "have" as used herein indicates that a feature, an operation, a component, a step, a number, a part or any combination thereof described herein is present. Further, the term "include" or "have" does not exclude a possibility of presence or addition of one or more other features, operations, components, steps, numbers, parts or combinations. Furthermore, the article "a" as used herein is intended to include one or more items. Moreover, no element, act, step, or instructions used in the present disclosure should be construed as critical or essential to the present disclosure unless explicitly described as such in the present disclosure.

Although the present technology has been illustrated with specific examples described herein for purposes of describing example embodiments, it is appreciated by one skilled in the relevant art that a wide variety of alternate and/or equivalent implementations may be substituted for the specific examples shown and described without departing from the scope of the present disclosure. As such, the present disclosure is intended to cover any adaptations or variations of the examples and/or embodiments shown and described herein, without departing from the spirit and the technical scope of the present disclosure.

What is claimed is:

1. An optical transceiver for use in a network device in a packet network comprising a ring topology, the network device being configured to support at least two optical interfaces and an electrical interface and to couple to an optical link, the optical transceiver comprising:
    a memory;
    a processor coupled to the memory; and
    a scheduler coupled to the processor,
    wherein the scheduler is configured to:
    perform as an information base for forwarding and transferring packets; and
    use the optical link as a packet buffer, and
        wherein a length of the packet buffer is determined based on one or more measurements of a propagation delay on the optical link divided by an operating frequency of the packet network having a ring topology.

2. The optical transceiver of claim 1, wherein the optical transceiver comprises a smart small form-factor pluggable (SFP) or a smart compact SFP (CSFP) module.

3. The optical transceiver of claim 1, wherein the optical transceiver comprises a smart bi-directional (BiDi) small form-factor pluggable (SFP).

4. The optical transceiver of claim 1, wherein the packet network comprises an Ethernet network.

5. The optical transceiver of claim 1, wherein the packet network comprises a Fiber Distributed Data Interface (FDDI), Synchronous Optical Network (SONET), Synchronous Digital Hierarchy (SDH), or Plesiochronous Digital Hierarchy (PDH) network.

6. The optical transceiver of claim 1, wherein the network device comprises an access point (AP), a femto AP, a security gateway, or a small cell gateway.

7. A network arrangement for digital communications in a packet network, comprising:
    an access point (AP) device;
    one or more network elements each provisioned with a single network port and coupled to an optical link for optical communications; and
    one or more smart optical transceivers each including at least two optical interfaces and an electrical interface,
    wherein, when the one or more smart optical transceivers are plugged into the one or more network elements and the access point device, the network arrangement forms a ring topology, wherein the one or more smart optical transceivers include a scheduler configured to perform as an information base for forwarding and transferring packets and to use an optical link as a packet buffer, and wherein a length of the packet buffer is determined based on a propagation delay measured on the optical link divided by an operating frequency of the packet network having the ring topology.

8. The network arrangement of claim 7, wherein the one or more smart optical transceivers comprise small form-factor pluggable (SFPs), or smart compact small form-factor pluggables (CSFPs).

9. The network arrangement of claim 7, wherein the packet network comprises an Ethernet network.

10. The network arrangement of claim 7, wherein the packet network comprises a Fiber Distributed Data Interface (FDDI), Synchronous Optical Network (SONET), Synchronous Digital Hierarchy (SDH), or Plesiochronous Digital Hierarchy (PDH) network.

11. The network arrangement of claim 7, wherein the access point comprises a femto access point, a security gateway, or a small cell gateway.

\* \* \* \* \*